(12) United States Patent
Dames et al.

(10) Patent No.: US 10,136,296 B1
(45) Date of Patent: Nov. 20, 2018

(54) SITUATIONAL AWARENESS SYSTEMS AND METHODS

(71) Applicant: Coolfire Solutions, Inc., St. Louis, MO (US)

(72) Inventors: John J. Dames, St. Louis, MO (US); Michael S. Biviano, St. Louis, MO (US)

(73) Assignee: Coolfire Solutions, Inc., St. Louis, MO (US)

( * ) Notice: Subject to any disclaimer, the term of this patent is extended or adjusted under 35 U.S.C. 154(b) by 0 days.

(21) Appl. No.: 15/933,088

(22) Filed: Mar. 22, 2018

(51) Int. Cl.
| | |
|---|---|
| *H04M 11/04* | (2006.01) |
| *H04W 4/90* | (2018.01) |
| *H04W 4/029* | (2018.01) |
| *H04W 4/02* | (2018.01) |
| *H04W 4/024* | (2018.01) |
| *H04L 29/08* | (2006.01) |
| *G06Q 10/06* | (2012.01) |
| *H04W 4/38* | (2018.01) |

(52) U.S. Cl.
CPC ............ *H04W 4/90* (2018.02); *H04L 67/20* (2013.01); *H04L 67/306* (2013.01); *H04W 4/023* (2013.01); *H04W 4/024* (2018.02); *H04W 4/029* (2018.02); *G06Q 10/06311* (2013.01); *H04L 67/12* (2013.01); *H04W 4/38* (2018.02)

(58) Field of Classification Search
CPC .......... G06N 5/02; G06N 7/005; G06Q 50/01; G06K 2009/00738; H04W 24/08; H04W 4/02; H04W 4/023; H04W 4/029; H04W 4/70; H04W 64/00; H04W 84/005
See application file for complete search history.

(56) References Cited

U.S. PATENT DOCUMENTS

| | | | |
|---|---|---|---|
| 8,823,507 B1 * | 9/2014 | Touloumtzis | H04L 67/24 340/501 |
| 9,867,023 B2 | 1/2018 | Rauner | |
| 2012/0232785 A1 * | 9/2012 | Wiesemann | G01C 23/00 701/423 |
| 2012/0239191 A1 * | 9/2012 | Versteeg | G06N 3/004 700/246 |

(Continued)

FOREIGN PATENT DOCUMENTS

| | | |
|---|---|---|
| EP | 2805316 A1 | 11/2014 |
| WO | 2013071157 A1 | 5/2013 |

*Primary Examiner* — Khalid Shaheed
*Assistant Examiner* — K Wilford
(74) *Attorney, Agent, or Firm* — Lewis Rice LLC

(57) ABSTRACT

Systems and methods for implementing a situation- and industry-agnostic situational awareness platform, which provide a suite of data services to client applications. The platform uses geographical and/or geo-temporal data associated with various endpoint devices in combination with real-time inputs from sensors and other connected devices, such as legacy systems or data sources, to identify urgent and emergent events and determine the appropriate endpoint devices to notify, and the content of notification, based on user-defined roles of users associated with each device as compared to the nature of the event, according to user-defined rules. The platform thus provides a common operational picture of a session of devices and integrates multiple point solutions into a single platform for decision support.

18 Claims, 5 Drawing Sheets

(56) References Cited

U.S. PATENT DOCUMENTS

| | | | |
|---|---|---|---|
| 2014/0125483 A1* | 5/2014 | Kane | G06Q 10/10 |
| | | | 340/539.13 |
| 2017/0251347 A1* | 8/2017 | Mehta | H04W 4/90 |
| 2018/0106626 A1* | 4/2018 | Baughman | G01C 21/3415 |
| 2018/0152403 A1* | 5/2018 | Charignon | H04L 51/16 |

* cited by examiner

SITUATIONAL AWARENESS SYSTEMS AND METHODS

BACKGROUND OF THE INVENTION

Field of the Invention

This disclosure is related to the field of situational awareness. In particular, it relates to systems and methods for providing real-time situational awareness data to endpoint devices in a distributed telecommunications network.

Description of the Related Art

Situational awareness refers to the perception of events and context in space and/or time. This generally involves awareness of what is transpiring within the immediate vicinity of the person perceiving events, as well as developing an understanding of how information, events, context, and actions will affect the goals or objectives of an actor, individual, or organization, both in the short and long term.

Typically, situational awareness involves a projection into the future of the status of an individual after some variable has changed, such as the passage of time, or the occurrence of an event. Situation and awareness is a key field of study in a number of industries, particularly those that involve rapidly changing operational environments and high stakes, such as aviation, military operations, and emergency services. Early theoretical work on situational awareness was performed by Dr. Mica Endsley. See, e.g., Toward a Theory of Situation Awareness in Dynamic Systems, Human Factors, 37(1):32-64 (1995).

As shown in prior art FIG. 1A, the Endsley model described three stages of situational awareness formation: perception 100, comprehension 102, and projection 104. Under perception, the status, attributes and dynamics of the relevant elements in the environment or context are perceived. This generally involves monitoring, detecting, or recognizing factors or developments relevant to the circumstances, such as objects, events, people, systems, and environmental factors, as well as their current states or statuses, such as locations, conditions, actions, or roles.

The second stage, comprehension 102, involves making sense of the various elements perceived. This information often arrives in a disorganized and disjointed fashion and must be examined, organized, and harmonized to develop an understanding of how the information will in turn affect the objectives or purposes of actors within the system. This process generally involves the development of a comprehensive understanding of the environment relevant to the actor in question by synthesizing perceived data or through evaluation, pattern recognition, and interpretation.

The third stage is projection 104, which is the ability to project or predict the future actions or behaviors of the various elements in play in the system. This generally requires knowledge of the roles, status, and capabilities of the various actors and elements at issue, as well as comprehension of the overall situation. Data is extrapolated forward in time to determine how future states will be affected by a change in any particular variable in the operational environment, which is used to support decision-making 106. Once an action is performed 108, the system state changes and the process begins anew.

A common implementation of situation awareness is known in the prior art as the "OODA Loop," depicted in FIG. 1B. OODA is an acronym for "observe, orient, decide, and act." As shown in FIG. 1B, the observe 110 element roughly corresponds to perception 100 in the Endsley model. Orient 112 roughly corresponds to comprehension 102. The OODA loop adds the aspects of decision-making and action 116, which in turn result in changes to the system state (e.g., feedback 118) which may be observed 110, restarting the OODA loop process.

It is known in strategic applications, such as the military, that the "tighter" OODA loop one can achieve, the greater advantage one has over other actors in the same system. In other words, the more rapidly that one can incorporate feedback from actions into the next round of observations, orient in the new system state, and make decisions, the more one can obscure one's own intensions while also developing greater clarity and accuracy as to the intentions of others. Such information disparities have obvious advantages in military and other high-stakes strategic applications.

However, in practical terms, situational awareness presents a number of difficulties due to the rapid pace of information flow and the difficulty for any one actor to perceive, understand, and project the system state in real time in support of decision-making. While the processing power of computers can assist, it is difficult to develop a computing platform to support situational awareness, generally due to the disjointed and disorganized nature of the relevant data. The relevant factors for any given situation tend to vary wildly from one situation to the next, making it difficult for a computing platform to implement a data model relevant to all situations.

For example, an airline pilot is concerned about, among other things, the mechanical integrity of the aircraft, local weather, weather at the destination, weather located between the destination and the starting point, the well-being of the passengers and crew, the fuel level of the aircraft, and so forth. None of this data is available from a single source. Weather data may be available via the National Weather Service, air traffic controllers, aircraft-based radar, or direct observation. The status of passengers is monitored only anecdotally through verbal reports from the flight crew. Fuel level is monitored visually via a mechanical fuel gauge. Still other factors, such as pilot fatigue, are known only to the pilot. It is difficult for a computer-implemented platform to organize all of this information into a single situational awareness model. Moreover, any such model would be limited to the specific data sources relevant to a pilot in the specific situation of operating a commercial passenger aircraft. Not all of these factors would apply to otherwise similar situations, such as a cargo or military pilot.

Compare this scenario to, for example, a delivery driver delivering medical supplies to a hospital. The driver is concerned about the mechanical integrity of the delivery vehicle, the integrity of the cargo, the fuel level of the vehicle, fatigue, traffic and weather on the route, and so forth. While some of these factors overlap with the airline pilot, others do not. Moreover, even the factors that overlap may not be perceived or measured in the same manner. For example, the route of an airplane is determined by flight path information filed with the Federal Aviation Administration prior to takeoff and adherence to the plan is monitored, whereas a delivery driver may deviate from the route at will. The context-specific nature of situational awareness makes it very difficult to implement a computer-based decision support platform suitable for use across multiple industries.

Further complicating this, the trend in computational analytics is towards "big data," wherein massive data stores are collected and subjected to various data mining techniques to identify patterns and meaningful statistical information. Big data is generally characterized by the volume or nature of the data being too large or complex for processing via traditional data processing application software, and instead requiring anywhere from tens to thousands of computer servers to process.

Prior art FIG. 2 shows, at a very high level, the basic architecture of a traditional big data system. In the depicted system 101 of FIG. 2, a plurality of data sources 103 are monitored and tracked by a computer server 105, generally over a telecommunications network 107. The server 105 copies or stores data received from the data sources 103 in a database 109 and uses a high-powered computing platform, such as a server farm, to examine the database 109 and identify potentially meaningful predictive analytics 111. These analytics 111 are then used for decision-making or support 106, as identified, for example, in FIG. 1A. Feedback 113 may be provided as to the quality of the analytics 111. This feedback 113 in turn may be used in future data processing to refine the analytics 111.

By its nature, data mining is relatively slow and unresponsive to emergent situations. For example, considering the OODA loop, which the goal is the tightest possible turnaround, the time required to develop a useful data mining analysis of the current system state is long enough that by the time the analytics are available, the system state has already changed enough to render them irrelevant. Thus, the OODA loop cannot be tightened in a big data implementation.

Further, for a number of reasons, pattern recognition and other forms of data mining are often not suitable for use in decision support. First, the context of each decision is usually specific to the immediate situation, because, by definition, situational awareness circumstances are fluid and rapidly changing. There simply may not be enough (or any) data available to mine for pattern recognition. By way of a simple example, cyclical traffic patterns may be analyzed and projected using data mining techniques, but this does not predict or indicate the occurrence of any particular traffic accident or road closure, which is the context-specific observation 110 needed in the OODA loop to make routing decisions for a delivery driver.

Second, knowledge of the factors relevant to a given industry or circumstance is needed in order to implement a robust situational awareness decision support system. However, a software developer typically has familiarity with only a few industries and usually lacks the breadth of knowledge required to implement systems that can receive and process all required data for a particular situation. As each new user of the platform is added, new sources of data are needed to support the platform for that particular user, expanding the cost and complexity of the platform, and overwhelming real-time data processing capabilities and storage requirements. Further, each individual business within an industry will have its own unique command structure and workflow. Not only is the data itself difficult to model in a uniform platform, but also relationships and task management are likewise difficult to model. This in turn makes the system less responsive, defeating its ultimate purpose. This also can result in enterprises having to adapt or modify tried-and-true business processes to conform to the limited capabilities of the software platform.

SUMMARY OF THE INVENTION

The following is a summary of the invention in order to provide a basic understanding of some aspects of the invention. This summary is not intended to identify key or critical elements of the invention or to delineate the scope of the invention. The sole purpose of this section is to present some concepts of the invention in a simplified form as a prelude to the more detailed description that is presented later.

Because of these and other problems in the art, described herein, among other things, is a method for providing decision support to a user comprising: providing an endpoint device of a user, providing a server computer; at the server computer associating an identifier with the user; associating a first context role identifier with the identifier; and associating an indication of an event context; the endpoint device transmitting to the server computer, at a predetermined frequency, a current geographic location of the endpoint device; receiving at the server computer an indication of an event associated with the event context and a geographic location of the event; and at the server computer, if the endpoint device is determined to be within a notification threshold distance of the event based on a comparison of the received current geographic location of the endpoint device to the geographic location of the event, transmitting to the endpoint device a notification message, the content of the message being determined based upon the first context role and the event context of the event.

In an embodiment of the method, the notification threshold distance of the event is received at the server from a third party data source.

In another embodiment of the method, the endpoint device comprises a mobile device of a user.

In another embodiment of the method, before the transmitting step, the endpoint device receives from the server computer a predetermined set of tasks assigned to the user.

In another embodiment of the method, the transmitting step further comprises the endpoint device transmitting to the server computer, at a predetermined frequency, a current geographic location of the endpoint device while the user performs the assigned set of tasks.

In another embodiment of the method, the transmitted message being determined based upon the first context role and the event context of the event.

In another embodiment of the method, the indication of an event associated with the event context and a geographic location of the event is received via a sensor communicably coupled to the server computer.

In another embodiment of the method, the sensor is selected from the group consisting of: an optical, light, imaging, or photon sensor; a motion or movement sensor; an electromagnetic sensor, an acoustic sensor; an automotive sensor; a chemical sensor; an electrical sensor; a magnetic sensor, a fluid sensor; a radiation sensor, a navigation instrument; an orientation or direction sensor, a pressure sensor; a thermal, heat, or temperature sensor; a force, density, or level sensor, a proximity or distance sensor; and an Internet-of-things device or sensor.

In another embodiment of the method, the indication of an event associated with the event context and a geographic location of the event is received via a third party data source communicably coupled to the server computer.

In another embodiment of the method, the indication of an event associated with the event context and a geographic location of the event is received via the endpoint device.

In another embodiment of the method, the endpoint device comprises a client application communicably coupled to at least one external data source.

In another embodiment of the method, the external data source comprises a third party point solution.

In another embodiment of the method, the event context comprises an urgent condition, the first context role identifier comprises a type of personnel trained to address the urgent condition, and the message comprises instructions for the user to address the urgent condition.

In another embodiment of the method, the event context comprises an urgent condition, the first context role identifier comprises a type of personnel not trained to address the urgent condition, and the message comprises instructions for the user to avoid the urgent condition.

In another embodiment of the method, the message comprises an identification of the event and a geographic location of the event.

The method of claim 15, wherein the endpoint device displays on a display of the endpoint device a map indicating the received geographic location of the event indicated in the message and the identification of the event.

In another embodiment of the method, the content of the message is further determined based upon a set of pre-defined rules.

In another embodiment of the method, the method further comprises: receiving at the server computer an indication of a change in the status of the event; and at the server computer, transmitting to the endpoint device a second notification message, the content of the second notification message being determined based upon the first context role and the event context of the event.

In another embodiment of the method, the transmitting step is performed automatically by the server computer.

In another embodiment of the method, the transmitting step is performed only after receiving at the server computer human-provided instructions to perform the transmitting step.

DESCRIPTION OF THE PREFERRED EMBODIMENT(S)

Figure 1A:
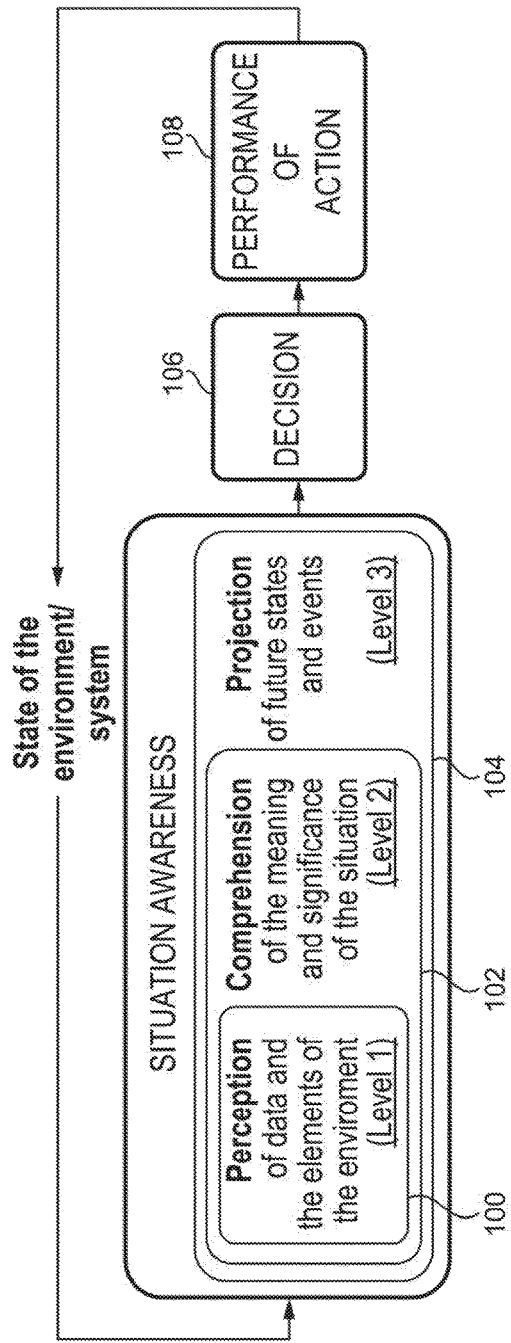
FIGS. 1A and 1B depict models of prior art situational awareness processes.
Figure 1B:
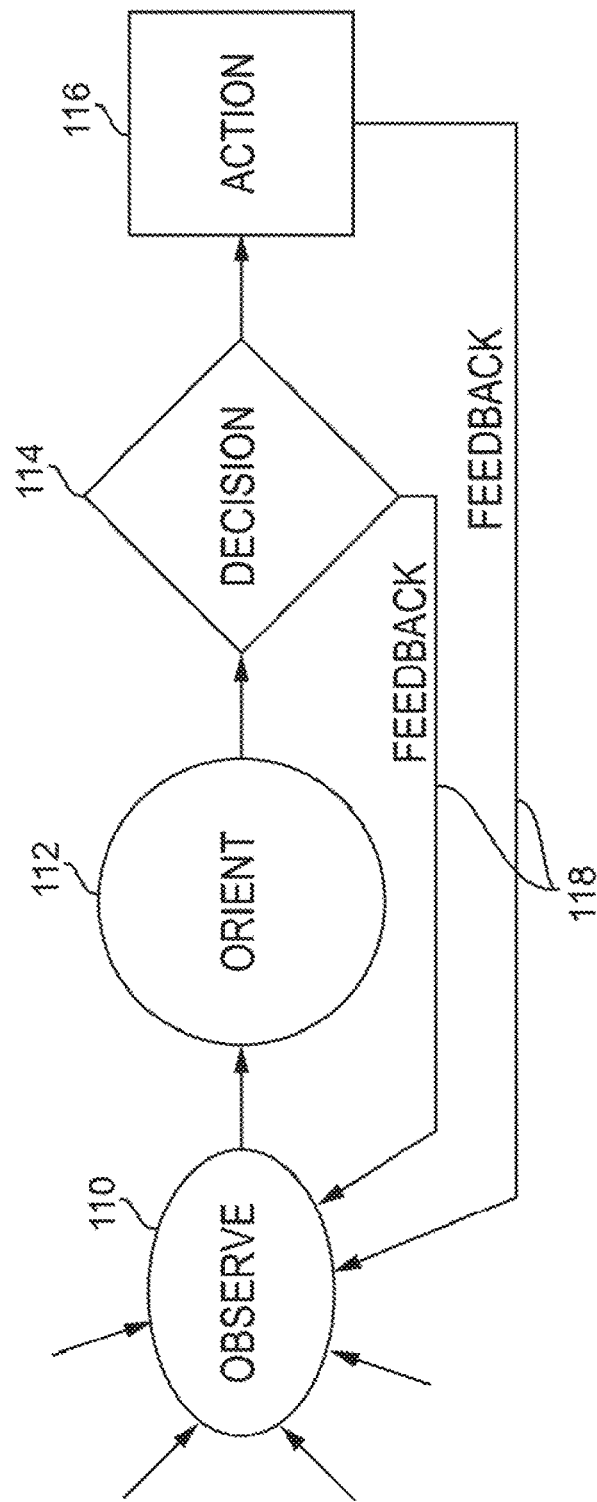
Figure 2:
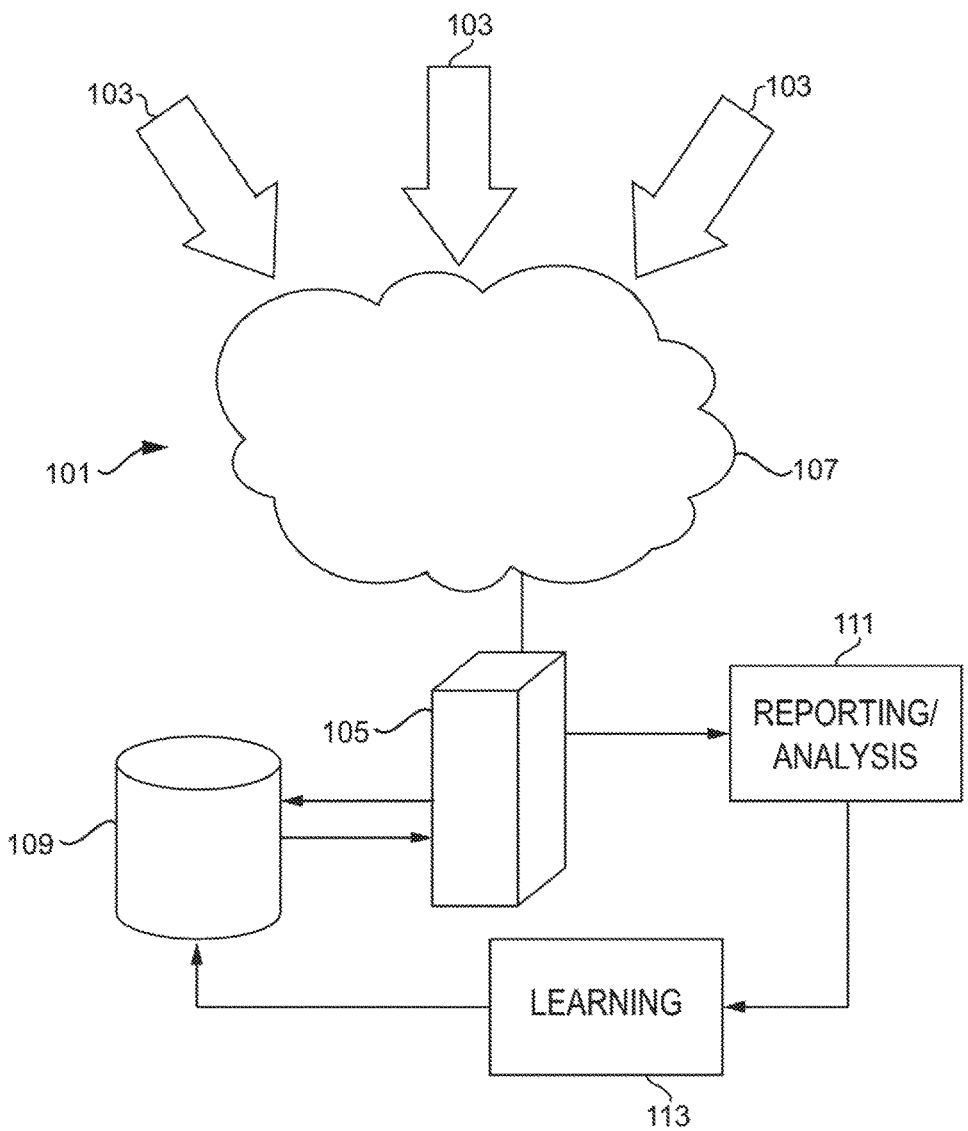
FIG. 2 depicts a logical diagram of a prior art big data system.

The following detailed description and disclosure illustrates by way of example and not by way of limitation. This description will clearly enable one skilled in the art to make and use the disclosed systems and methods, and describes several embodiments, adaptations, variations, alternatives and uses of the disclosed systems and methods. As various changes could be made in the above constructions without departing from the scope of the disclosures, it is intended that all matter contained in the description or shown in the accompanying drawings shall be interpreted as illustrative and not in a limiting sense.

Throughout this disclosure, the term "computer" describes hardware, which generally implements functionality provided by digital computing technology, particularly computing functionality associated with microprocessors. The term "computer" is not intended to be limited to any specific type of computing device, but it is intended to be inclusive of all computational devices including, but not limited to: processing devices, microprocessors, personal computers, desktop computers, laptop computers, workstations, terminals, servers, clients, portable computers, handheld computers, cell phones, mobile phones, smart phones, tablet computers, server farms, hardware appliances, mini-computers, mainframe computers, video game consoles, handheld video game products, and wearable computing devices including but not limited to eyewear, wrist wear, pendants, fabrics, and clip-on devices.

As used herein, a "computer" is necessarily an abstraction of the functionality provided by a single computer device outfitted with the hardware and accessories typical of computers in a particular role. By way of example and not limitation, the term "computer" in reference to a laptop computer would be understood by one of ordinary skill in the art to include the functionality provided by pointer-based input devices, such as a mouse or track pad, whereas the term "computer" used in reference to an enterprise-class server would be understood by one of ordinary skill in the art to include the functionality provided by redundant systems, such as RAID drives and dual power supplies.

It is also well known to those of ordinary skill in the art that the functionality of a single computer may be distributed across a number of individual machines. This distribution may be functional, as where specific machines perform specific tasks; or, balanced, as where each machine is capable of performing most or all functions of any other machine and is assigned tasks based on its available resources at a point in time. Thus, the term "computer" as used herein, can refer to a single, standalone, self-contained device or to a plurality of machines working together or independently, including without limitation: a network server farm, "cloud" computing system, software-as-a-service, or other distributed or collaborative computer networks.

Those of ordinary skill in the art also appreciate that some devices, which are not conventionally thought of as "computers", nevertheless exhibit the characteristics of a "computer" in certain contexts. Where such a device is performing the functions of a "computer" as described herein, the term "computer" includes such devices to that extent. Devices of this type include but are not limited to: network hardware, print servers, file servers, NAS and SAN, load balancers, and any other hardware capable of interacting with the systems and methods described herein in the matter of a conventional "computer."

As will be appreciated by one skilled in the art, some aspects of the present disclosure may be embodied as a system, method or process, or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable media having computer readable program code embodied thereon.

Throughout this disclosure, the term "software" refers to code objects, program logic, command structures, data structures and definitions, source code, executable and/or binary files, machine code, object code, compiled libraries, implementations, algorithms, libraries, or any instruction or set of instructions capable of being executed by a computer processor, or capable of being converted into a form capable of being executed by a computer processor, including without limitation virtual processors, or by the use of run-time environments, virtual machines, and/or interpreters. Those of ordinary skill in the art recognize that software can be wired or embedded into hardware, including without limitation onto a microchip, and still be considered "software" within the meaning of this disclosure. For purposes of this disclosure, software includes without limitation: instructions stored or storable in RAM, ROM, flash memory BIOS, CMOS, mother and daughter board circuitry, hardware controllers, USB controllers or hosts, peripheral devices and controllers, video cards, audio controllers, network cards, Bluetooth® and other wireless communication devices, virtual memory, storage devices and associated controllers, firmware, and device drivers. The systems and methods described here are contemplated to use computers and computer software typically stored in a computer- or machine-readable storage medium or memory.

Program code embodied on a computer readable medium may be transmitted using any appropriate medium, including but not limited to wireless, wireline, optical fiber cable, RF, etc., or any suitable combination of the foregoing.

Throughout this disclosure, the term "network" generally refers to a voice, data, or other telecommunications network over which computers communicate with each other. The term "server" generally refers to a computer providing a service over a network, and a "client" generally refers to a computer accessing or using a service provided by a server over a network. Those having ordinary skill in the art will appreciate that the terms "server" and "client" may refer to hardware, software, and/or a combination of hardware and software, depending on context. Those having ordinary skill in the art will further appreciate that the terms "server" and "client" may refer to endpoints of a network communication or network connection, including but not necessarily limited to a network socket connection. Those having ordinary skill in the art will further appreciate that a "server" may comprise a plurality of software and/or hardware servers delivering a service or set of services. Those having ordinary skill in the art will further appreciate that the term "host" may, in noun form, refer to an endpoint of a network communication or network (e.g., "a remote host"), or may, in verb form, refer to a server providing a service over a network ("hosts a website"), or an access point for a service over a network.

Throughout this disclosure, the term "cloud" and "cloud computing" and similar terms refer to the practice of using a network of remote servers hosted and accessed over the Internet to store, manage, and process data, rather than local servers or personal computers.

Throughout this disclosure, the terms "web," "web site," "web server," "web client," and "web browser" refer generally to computers programmed to communicate over a network using the HyperText Transfer Protocol ("HTTP"), and/or similar and/or related protocols including but not limited to HTTP Secure ("HTTPS") and Secure Hypertext Transfer Protocol ("SHTP"). A "web server" is a computer receiving and responding to HTTP requests, and a "web client" is a computer having a user agent sending and receiving responses to HTTP requests. The user agent is generally web browser software.

Throughout this disclosure, the term "real time" refers to software operating within operational deadlines for a given event to commence or complete, or for a given module, software, or system to respond, and generally invokes that the response or performance time is, in ordinary user perception and considered the technological context, effectively generally cotemporaneous with a reference event. Those of ordinary skill in the art understand that "real time" does not literally mean the system processes input and/or responds instantaneously, but rather that the system processes and/or responds rapidly enough that the processing or response time is within the general human perception of the passage of real time in the operational context of the program. Those of ordinary skill in the art understand that, where the operational context is a graphical user interface, "real time" normally implies a response time of no more than one second of actual time, with milliseconds or microseconds being preferable. However, those of ordinary skill in the art also understand that, under other operational contexts, a system operating in "real time" may exhibit delays longer than one second, particularly where network operations are involved.

Throughout this disclosure, the term "GUI" generally refers to a graphical user interface for a computing device. The design, arrangement, components, and functions of a graphical user interface will necessarily vary from device to device depending on, among other things, screen resolution, processing power, operating system, device function or purpose, and evolving standards and tools for user interface design. One of ordinary skill in the art will understand that graphical user interfaces generally include a number of widgets, or graphical control elements, which are generally graphical components displayed or presented to the user and which are manipulable by the user through an input device to provide user input, and which may also display or present to the user information, data, or output. Outputs may be text, graphs, or other data.

Throughout this disclosure, the term "endpoint device" refers to a network-enabled computer device communicating with a server system providing services over a telecommunication or other infrastructure network. An endpoint device typically includes a computer or microprocessor processor, and is usually mobile and not fixedly associated with a location. Endpoint devices are usually carried by a user, and usually are in continuous or frequent real-time communication over a network. By way of example, an endpoint device may be, without limitation, a smart phone, tablet PC, e-reader, satellite navigation system ("SatNav"), fitness device (e.g., a Fitbit™ or Jawbone™) Internet-of-things ("IOT") device or any other type of computer whether of general or specific purpose functionality. Traditional fixed location devices may also be endpoint devices, as described herein.

Described herein, among other things, are systems and methods for implementing a situation- or industry-agnostic situation awareness decision support platform in a "little data" architecture. The systems and methods described herein provide a uniform suite of common data services in conjunction with user-defined roles and types to implement a universal, situation-agnostic platform suitable to implement context-specific situational awareness client applications. Such applications cover a limitless variety of industries and situations, some of which are described herein for non-limiting, illustrative purposes. It is important to understand that the backend or server aspects of the system described herein is implemented via a uniform interface applicable to any application from military operations to delivering snacks to a guest at a stadium. The systems and methods described herein also address "data blindness" problems where, particularly in edge situations, a given operator or actor in the system has access only to partial information relevant to his or her immediate context and cannot see the overall big picture of the system state, yet needs immediate decision support without being overwhelmed by massive quantities of data, much of which is potentially irrelevant to the individual's immediate context. The systems and methods described herein enable a uniform "view" into the system state to ensure all actors in a given team have the same understanding of the situation and context, sometimes referred to as a common operational picture.

Figure 3:
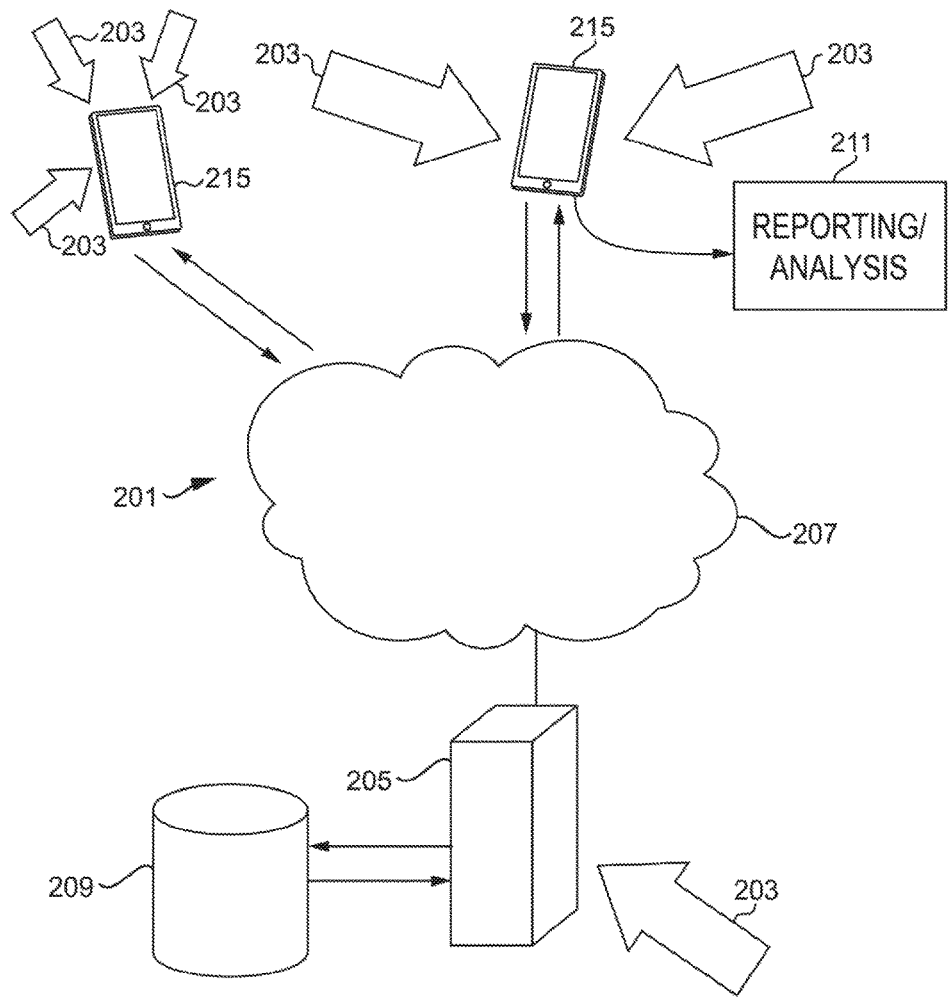
FIG. 3 depicts a logical diagram of a situational awareness computing platform according to the present disclosure.

FIG. 3 depicts, at a high level of abstraction, an embodiment of the systems and methods described herein, sometimes referred to as "little data." Whereas big data solutions search massive quantities of data in search of pattern recognition, little data systems understand that most gathered data is irrelevant or immaterial to the current situation or context. Rather than search for intelligence in statistical patterns derived from massive datasets, little data systems pinpoint the relatively small number of discrete and highly relevant data points for a given context or situation. Unlike a traditional big data implementation, this is done by using the processing power of an endpoint device 215 to implement industry- or situation-specific workflow logic and data connections, and to communicate some or all data to a central computer server 205 having a generally uniform situational awareness platform implemented thereon, generally over a telecommunications network 207.

Some or all received data may be stored in an associated database 209. The computer server 205 generally is programmed with a server in the nature of a uniform situational awareness support software service, which provides common services to all connected endpoint devices 215 based on configuration established by users, the data received, and the functions requested. This facilitates a uniform situational awareness server platform adaptable for use across a variety of industries and situations, with application- or industry-specific programming primarily implemented on the endpoint device 215. Some commonly used data sources and/or services may also or alternatively be provided as generic services via the server, such as mapping, routing, weather, traffic, and so forth.

The depicted central server 205 generally is programmed to provide three primary functions. First, the server 205 is programmed to receive and track the locations of endpoint devices 215, usually associated with a session. These locations are generally provided to the server 205 by the endpoint devices 215 via the telecommunication network 207. The endpoint devices 215 typically determine their own location using location detection technologies implemented at the endpoint devices 215. For example, a Global Positioning System (GPS) receiver in a mobile phone 215 may periodically provide the phone's location data to the server 205 over the telecommunications network 207. In some embodiments, one or more endpoint devices 215 may have a fixed location, such as a security or traffic camera. These locations may be established at the server 205 via configuration data. The server 205 may maintain an historical record of locations of each device 215 as received by the server 205.

These devices 215 generally will transmit at regular intervals the location of the device, along with a timestamp. The location data, along with a unique identifier for each device 215 (e.g., a user ID), and the timestamp when the location data was captured, are stored in the database 209. This provides the server 205 with a record of the most recent location data for each device 215, and the time of that location data. Additionally, or alternatively, the server 205 may store a timestamp of when the server 205 received the location data, allowing the server 205 to identify gaps that may indicate poor connectivity or malfunction of an endpoint device 215. For example, if the server 205 receives an updated location timestamped more than an hour ago, this information may be used to determine whether notifications or messages should be sent to that device 215 as described elsewhere herein, or used to alert a supervisor of a potential problem. The location data transmitted by the endpoint devices 215 may be retransmitted to one or more other endpoint devices 215 connected via the same session.

Second, the server generally is programmed to implement messaging and notification services, whereby information, messages, and/or alerts are sent by the server 205 to one or more endpoint devices 215 over the telecommunications network 207, typically based on context-specific data, such as in response to events or variable changes that alter the projected status of the actors in the system. By way of a simple example, if a particular endpoint device 215 connected to the server 205 suddenly discontinues communication with the server 205 for at least a threshold period of time, the server 205 may send a notification to one or more other endpoint devices 215 connected to the server 205 that the non-responsive device 215 is offline. Typically, the particular endpoint devices 215 to which a given message or alert is to be sent by the server 205 is determined based on a comparison of a relevant geographic region associated with the message to the most current location data for each endpoint device 215. If a given endpoint device 215 is determined to be within the associated geographic region for the alert, the message is sent to that endpoint device 215.

Additionally, or alternatively, messaging may be sent to an endpoint device 215 based upon other context data, such as whether the assigned user of that endpoint device 215 has a status, role, mode, or other characteristic data that matches a context characteristic associated with the message. For example, if the message is relevant to only users having a specific role in the organization, then the role of the user assigned to each endpoint device 215 is compared to the role associated of the message, and the message is sent only to those endpoint devices 215 assigned to users having the matching role. As described in more detail elsewhere herein, the data for the various roles, status, or modes in the system is provided as configuration data for a particular application 217, storage model and/or defined by the implementer of the client application 217 (described elsewhere). The configuration data is usually data stored at the server 205. The server 205 itself is generally data-agnostic, as described elsewhere herein.

Third, the server 205 supports custom workflows via a uniform, content-agnostic data exchange protocol. As described in the background section, each specific industry or situation develops situational awareness based on the operational experience, knowledge, and best practices developed by experts in that field. The workflows appropriate to any one situation are difficult to support in a single server platform. The depicted server 205 facilitates custom workflow by shifting the industry-specific workflow logic to a client application 217 running on one or more endpoint devices 215. These applications 217 are specific to the industry and conform to the workflow of that industry. The applications 217 may be existing applications modified to use the server 205 or newly built. This is an improvement over the prior art, in which users were expected to change workflow to conform to the preprogrammed capabilities of a server.

The client side application 217 also is often the simplest place to implement situation-specific data monitoring, such as access to third-party systems that are particular to a given context or industry. By way of example and not limitation, a car rental company may integrate inventory tracking systems, personnel management systems, and reservation and ticketing systems at the client application 217, as these systems and their associated workflows are likely particular to the specific car rental company and unlikely to be used in exactly the same manner by any other user. However, commonly used data sources that are shared across industries may be implemented at the client 217, but may also, or alternatively, be made available via the server 205. Without limitation, examples of such data sources include: weather services; mapping, routing, and traffic services; and law enforcement and emergency notification services.

Implementing situation-specific data monitoring at the client application 217 allows each industry or enterprise to integrate the situational awareness platform of the server 205 with existing workflow, third-party applications, and data sources without having to alter the way tasks are completed. By implementing commonly used third-party data sources at the server 205, development time and data duplication is reduced. This may be done on a session-by-session basis, or globally.

By bringing all of these disparate systems to bear in a client application 217, a "system of systems" is provided which facilitates the harmonization and synchronization of multiple systems in use by a company, which do not necessarily bear any relationship to each other. Returning to the car rental agency example, a car rental company generally has an inventory database tracking the vehicles that are in the rental fleet and their respective operational statuses. Additionally, the agency generally has a database of reservations or requests for vehicles. Although these two systems may appear to be similar, they in fact bear no relationship to each other. That is, whether the agency currently happens to have any given make or model of vehicle in operational condition in a given location is immaterial to whether a rental customer currently desires the use of such a vehicle.

Thus, fleet management software is generally focused on data about the condition of vehicles in the fleet, whereas a reservation system is generally focused on data about customers and times. Neither system has any particular need for data in the other. For example, a fleet database might be used for a car dealership or delivery service, both of which maintain vehicle fleets that are not rented out. Conversely, a reservation system is applicable to industries that do not involve vehicles at all, such as restaurant tables and event ticketing.

By developing a client application 217 that incorporates both fleet management and reservation systems, and incorporating common data services available via the server, the company can provide a "system of systems" that offers to all users a common operational picture of both systems while also integrating with other third-party data, such as weather and map information. The systems and methods described herein are thus also different from point solutions, which are highly specialized solutions to a given discrete problem. Instead, the systems and methods described herein use point solutions as inputs or data sources, and can leverage the problem-specific logic implemented via point solutions into a single platform for a given actor or system: again, a "system of systems."

The core functions of the server 205 provide new context to existing data and legacy systems, connect operators and actors within the system more efficiently, and enhance operational workflow and efficiency by providing real-time data via a data-agnostic platform. To illustrate how the systems and methods described herein operate, a description of the basic data exchanged within the system is provided, along with specific examples.

First, an organization or industry seeking to utilize the power of the platform described herein implements a client software application 217 for use on certain endpoint devices 215 connected to the server 205. This application 217 may be an existing application 217 already used by the enterprise and is adapted to use the server 205 as described herein, or an entirely new application 217 custom built to use the server 205 described herein. This application contains industry, situation, or enterprise specific workflow logic and programming in accordance with the operational needs of the particular enterprise. In most cases, this implementation process includes defining the major situational awareness variables described in this disclosure, such as the actors, roles, events, data sources, to be tracked. Some or all of this data is stored at the server 205, usually in the database 209, in a format understandable by the server 205.

By way of simple example, if the enterprise is a first responder, the roles may include "dispatcher", "firefighter", "police", "EMS", and the like. This configuration data may be stored in any appropriate format. For example, the string descriptors may be uploaded to the server and associated with a unique identifier for each role. When a new user is added to the system, each user is then associated in the configuration data with one or more of these roles.

Similarly, as described elsewhere herein, events and messages may likewise be associated with one or more roles. For example, a given message may be relevant only to dispatchers, and thus the server will send "dispatch" messages only to endpoint devices 215 associated with users having the role of "dispatcher." The particular composition and complexity of the configuration data for any given implementation will of course depend upon the particular needs of the specific application. Examples of the type of application-specific data that may be relevant in an embodiment include: users; equipment; inventory; routes; locations; destinations; events; and so forth.

Referring to FIG. 3, in a typical use of the systems and methods, each user is associated with an endpoint device 215 having the appropriate client application 217 thereon. The user arrives at work in possession of the endpoint device 215 and operates the device to start the client application 217 for job function. The application 217 authenticates a session with the server 205 via the telecommunication network 207. Authentication techniques are well known in the art and need not be further explained in detail herein.

The server then adds the authenticated endpoint device 215 to a session. A session, as used herein, is essentially a collection of client-server connections between the server 205 and one or more endpoint devices 215, wherein all of the endpoint devices 215 in the session are used for a common operational or business purpose. For example, in the depicted embodiment of FIG. 4, five endpoint devices 215 are being used. There may be other, separate sessions using the same server 205 via a different collection of endpoint devices (not depicted). Thus, the depicted endpoint devices 215 are all part of a shared session, generally identified via a session key or other identifier as would be understood to one of ordinary skill in the art, and the other (not depicted) endpoint devices are part of a separate session also identified by a separate unique key or identifier. When a device communicates with the server 205, it may transmit the associated session key, allowing the server 205 to identify other related devices in the same session. The session concept allows related devices to share communications and information with each other, while not sharing those same communications and information with devices in other sessions. This allows a single server implementation to support a multitude of unrelated situational awareness clients, without risk of sensitive data being inadvertently shared outside of the collection of endpoint devices 215 associated with each individual enterprise. Additionally, this reduces or eliminates the distribution and/or sharing of data to a multitude of users which may not necessarily be relevant to each.

The server 205 may receive, create, or assign a unique identifier to the particular endpoint device 215 associated with the user. The application 217 on the endpoint device 215 may transmit a unique user identifier, such as a user name, to the server 205, so that the server 205 has data usable to identify the specific user of the endpoint device 215 and can access configuration data about that user, such as name, role, status, and so forth, which is then used to determine which notifications should be sent to that endpoint device 215.

Typically, the server 205 is provided or configured with tasks that may be assigned, or assignable. For example, tasks may be assigned either to a specific user or to any user having the role associated with the task. Tasks may be configured at the server 205 by an administrator or supervisor user, usually by use of a separate endpoint device 215 of such administrator or supervisor. When the user connects via the endpoint device 215, the endpoint device 215 requests the tasks for the user, which tasks are transmitted by the server 205. By way of example, if the user is assigned the role of "driver" in a delivery service, the tasks received may be a set of pickups, deliveries, or routes. However, if the user's role in the same enterprise is "mechanic," the tasks may be a set of vehicles requiring service. The application software 217 on the endpoint device 215 transmits the location of the endpoint device 215 on a periodic, and generally regular, interval to the server 205 as described elsewhere herein as the user goes about completing the assigned tasks. This process is repeated for other actors in the system.

The server 205 and/or the endpoint device 215 also may receive data, including without limitation, from data sources 203 relevant to the endpoint device 215. In an embodiment, the endpoint device 215 is the primary point for receiving such data, because the endpoint device 215 is programmed with application software 217 appropriate to the industry. The application 217 on the endpoint device 215B is programmed to connect to such external data source and receive the data 203B. The received data 203B may, in an embodiment, be repackaged and sent to the server 205 in accordance with a standard format defined by the server's communication protocols or may be transmitted in the native format in which it is received. The reformatting and repackaging is performed by the application software 217 on the endpoint device 215B. As will be clear to a person of ordinary skill in the art, these data sources may include "big data" sources. That is, the present systems and methods are not big data solutions to a problem, but may use big data sources as an observable 110 input or data source. In an embodiment, the server 205 may also, or alternatively, receive data directly from one or more data sources 203E, or directly from external monitors 215A and/or sensors 215A.

The endpoint device 215 begins to send location data updates as described herein. The user completes tasks as assigned and marks the tasks as completed in the application software 217 on the endpoint device 215, and the endpoint device 215 communicates with the server 205 to indicate that the tasks have been completed. When the user has finished all tasks for the day, he may close the application 217 or otherwise send an indication that all tasks are done.

Referring again to the OODA loop, tasks and other system outputs may also be used as inputs to the next cycle in the loop. Data such as whether a given task has been completed, or how far along the assigned resource is towards completing the task, become observable data points for further orientation 110 and decision-making.

In the event that there is a change in the system state (e.g., session), the system can be used to provide real-time situational awareness decision support. In a typical case, one or more endpoint devices 215 communicating with the server 205 may receive data from a data source 203 indicative of an event or variable change, usually associated with a geographic region, which may affect other users in the session. When this happens, the relevant endpoint device 215 may transmit to the server 205 data concerning the detected event or variable change. This data may include an identifier of the nature of the event or variable change, and may also, or alternatively, include additional data pertaining to the event.

The server 205, upon receiving such a notification from an endpoint device 215, may then send a notification or alert to other potentially impacted endpoint devices 215. In a typical case, because the location of connected endpoint devices 215 is known by the server 205, the server 205 can determine which endpoint devices 215 are within the associated geographic region of the event or variable change, and can transmit to such endpoint devices 215 a notification or alert concerning the detected event or variable change. Endpoint devices 215 receiving this alert may then display the alert. This same process can be carried out using data received directly by the server 205 from a data source 203. For example, the server 205 may be programmed to continually monitor weather for dangerous events and notify all connected devices 215 (in any session) of any weather event impacting the geographic region in which the endpoint device 215 or other relevant asset is located (according to the most recently received location data).

Additionally, users having supervisory or administrative roles may send specific messages to specific endpoint devices 215, the receiving devices being determined by the server 205 based on whether the device 215 or user associated with the endpoint device 215 match the criteria relevant to the message. The server 205 may determine which endpoint devices 215 should be notified or given an alert or message based on configuration data associated with the users of each endpoint device 215. For example, a common factor in situational awareness is the mode or role of a given user. Depending upon the mode or role of the user, certain messages may or may not be relevant to that user. As described herein, user data is typically established in the server 205 memory or database 209, and associated with a role or mode. This role or mode is essentially the unique identifier defined by configuration data provided by the administrator or supervisors of the application software 217 on the endpoint devices 215.

The server 205 generally is agnostic as to the nature of this role or mode data, and it may be as simple as a unique identifier (e.g., 3 equals "delivery driver"). Thus, when an alert is sent, the server 205 uses the configuration data indicating what types of alerts correspond to which types of roles to then determine which endpoint devices 215 are associated with users who should receive a given message. For example, the server 205 may be programmed with configuration data providing that alert type "C" goes to users with role "3". In this example, notification type "C" may be a weather emergency, which is relevant to all delivery drivers (assigned role "3"). However, users with a different role (e.g., "5" referring to "mechanics") may be indoors in a repair facility and thus not affected by events of type "C" (weather). In this way, the server 205 remains data-agnostic, and the specific knowledge of the meaning of these roles and alerts and the relevant workflow is implemented primarily via the application software 217.

Figure 4:
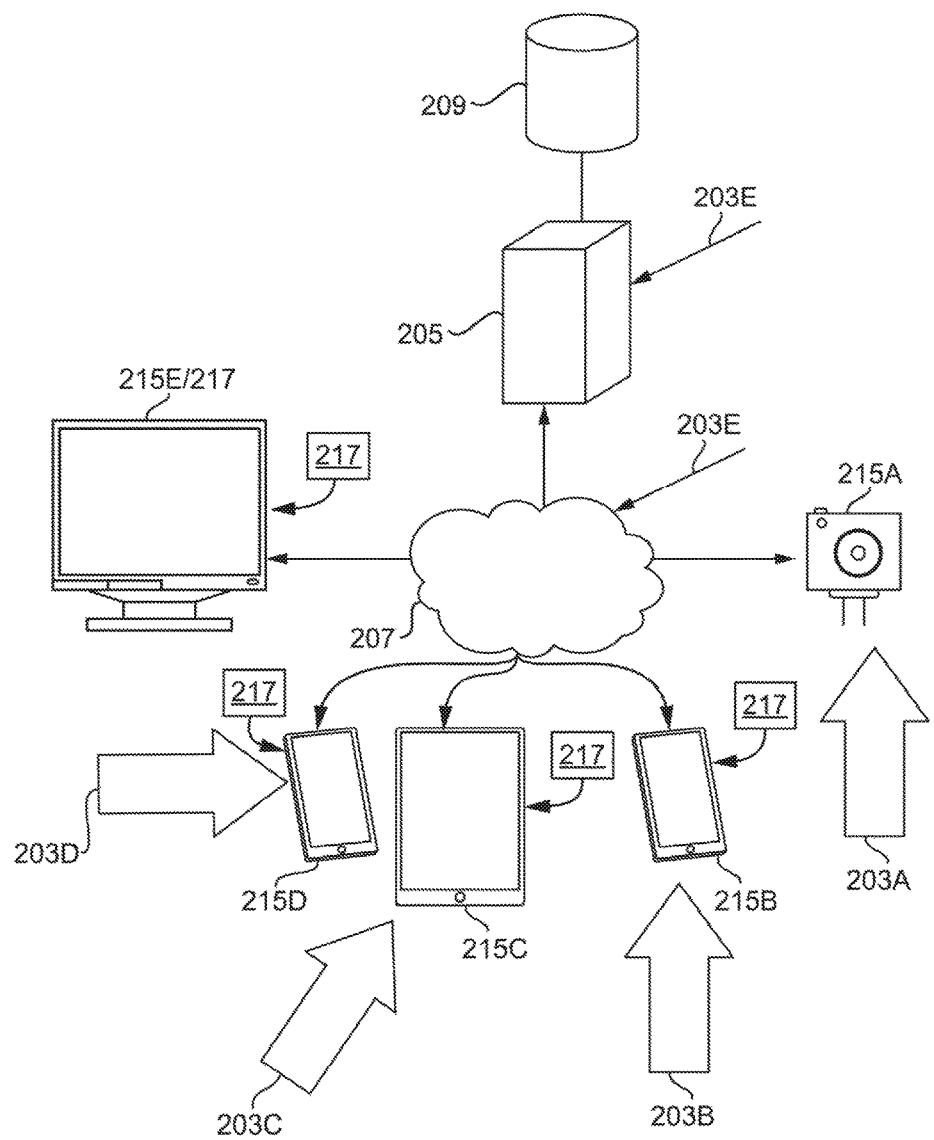
FIG. 4 depicts a more detailed logical diagram of a situational awareness computing platform according to the present disclosure.

Referring now to FIG. 4, a more detailed schematic view of an implementation of the systems and methods described herein is depicted. In the depicted embodiment of FIG. 4, a situational awareness server 205 is operatively connected to a database 209 and communicates via a telecommunications network 207 with a plurality of endpoint devices 215A, 215B, 215C, 215D, 215E (referred to herein collectively as endpoint devices 215). In the depicted embodiment of FIG. 4, a first endpoint device 215A is a sensor.

The depicted sensor 215A is an optical sensor, such as a digital camera communicatively connected to the server 205 via the telecommunications network 207. The sensor 215A is effectively one data input 203 to the server 205. A second depicted endpoint device 215B is a mobile phone of a user. A third depicted endpoint device 215C is a tablet computer of another user. A fourth depicted endpoint device 215D is another mobile phone of a user. Finally, a fifth depicted endpoint device 215E/217 is a desktop computer.

Each of the depicted endpoint devices 215 communicates via the telecommunications network 207 with the server 205. Again, the nature of the communications and data provided by each endpoint device 215 depends upon each endpoint device's 215 role in the system. For example, sensors, such as depicted device 215A, provide data in a format and nature particular to the detection capabilities of the sensor. Because depicted sensor 215A is an optical sensor, image data would be transmitted, potentially with other data, such as resolution, timestamp, orientation, and any other information that the sensor 215A is designed to detect and transmit.

In any given implementation, one or more sensors 215A may be used to provide inputs, either or both to a client application 217 on an endpoint device, or directly to the server. The number and type of sensors will naturally vary from embodiment to embodiment depending on the particular needs of any given implementation. In some cases, a single sensor or handful of sensors may be used, whereas in others the system may use thousands or millions of individual sensors. Generally, sensor inputs are provided to the server 205, either indirectly via a client application or endpoint device, or directly. A function of the server 205 in such an embodiment is to filter a large amount of sensor data, generally received in real-time, to disregard data that is not indicative of an event or other context requiring action or consideration.

By way of simple example, consider an embodiment in which one input to the system is a temperature sensor in a storage structure, such as a warehouse or grain silo. The acceptable temperature readings are known to the industry, and the vast majority of the temperature readings in the structure will be within a normal and acceptable range. Because such readings are indicative of a non-actionable context, they are generally disregarded (operationally, they may be logged or recorded for posterity) and not reported via the system. This filtering function eliminates unnecessary information, as stakeholders in the system will assume normal temperature readings absent an affirmative indication otherwise. By contrast, when a sensor reading, such as temperature in this example, is above or outside acceptable parameters, the filtering function of the server 205 may trigger an alert, message, or notification. Based on context-specific rules defined by the user, the recipients of this information will depend on user-configured data. For a temperature anomaly, for example, it may be appropriate to notify only those users whose role matches the context of the alert (excessive temperature), such as firefighters, and who are located closest to the alert (as determined via mapping data at the server 205) or can reach the location of the alert the most rapidly (as determined via routing services at the server 205). Similarly, the filtering function may determine not to alert other users, even if nearby, whose defined role does not match the emergency. For example, a user assigned the role of grain truck driver cannot assist with a fire emergency and would not only not be routed to the fire, but might instead be routed away from it for safety.

By way of another non-limiting example, sensors may be dozens or hundreds of optical cameras in a public or semi-public venue, such as an airport or sports stadium, with connected facial recognition software. These cameras may conduct facial recognition of passersby and attempt to match individuals to a database of wanted criminals, terrorists, or other wanted persons.

When a match is found, the present systems and messages may be used to route a message to relevant personnel. For example, if the matched individual is indicated as being potentially armed and dangerous, unarmed venue security personnel may not be alerted, but instead the nearest armed law enforcement officer may be notified of the presence of the individual and the specific location. Again, by providing context-specific data effectively in real-time, the OODA loop is tightened and there is a greater chance that the system achieves its operational goals. The alerted officer, receiving the notification in real-time of a wanted individual physically proximate to the officer's location, is more likely to be able to confirm visually the presence of the detected offender and to track the person down for arrest. These are just some examples of the types of sensors that may be used, and any type of sensor is appropriate for use as described herein, including the Internet-of-things and other inputs.

Generally speaking, events are driven by inputs to the system at the observation 110 level. These inputs may come from sensors, as in these examples, or from other data sources, such as information supplied to the server 205 via the client application 217, or information supplied directly to the server via third-party data sources or services like weather and traffic services, as described elsewhere herein. The system response to events depends on the context logic as programmed via the client application 217 and established in user-supplied rules and context definitions. Responses may be autonomous or require manual input based on a human decision.

As described elsewhere herein, the depicted endpoint devices 215B, 215C, and 215D are ordinarily carried by users needing situational awareness decision support, who are often in the field remote from a centralized location, where there may be intermittent or unreliable network connectivity. The devices 215B, 215C, and 215D contain that client application software 217 implementing the situation-specific or industry-specific workflow to provide the appropriate situational awareness.

The endpoint devices 215, via the application software 217, may also have or receive data 203 from other sources. In the case of a sensor, such as the depicted camera 215A, the data 203A received by the device 215A is light or other electromagnetic radiation. Alternatively, in the case of a user device such as the mobile phones 215B and 215D, data 203B and 203D may be received from third-party sources in accordance with the operational needs of the application 217.

For example, if the industry in question is a delivery service, endpoint device 215B may receive data 203B from a traffic monitoring service. This could be a built-in traffic monitoring service native to the operating system of the endpoint device 215B, or a third-party source. The delivery driver application 217 may include a traffic or mapping system 203, and receive real-time weather 203 and traffic 203 data. In an alternative embodiment, this data may be provided to the server 205 and transmitted via notifications as described elsewhere herein. As the endpoint device 215 receives this data 203, the endpoint device 215 may reformat and/or repackage the data 203 into a standard structure for transmission to and storage at the server 205. Alternatively, the relevant data 203 may be sent in a native format to, and stored at, the server 205. This allows the server 205 to redistribute data in native format to other endpoint devices 215 that have application software 217 capable of understanding that data.

The data 203B may be weather data, traffic data, or vehicular telematics data received from the delivery vehicle (e.g., via the vehicle's data port or via wireless communications such as Bluetooth™). One or more of these data input streams 203 to the application 217 may be packaged, together or separately, for transmission to the server 205 as described elsewhere herein. This same basic functionality applies to all endpoint devices 215 and the data inputs 203A, 203C, 203D received by each.

Not all endpoint devices 215 necessarily have the same functionality available in the application software 217, and, depending upon the assigned role of the person carrying the device 215 (as reflected in configuration data), the features available may differ from endpoint device 215 to endpoint device 215. For example, in the depicted embodiment of FIG. 4, endpoint device 215C could be a tablet PC of a manager or supervisor responsible for overseeing the delivery activities of the users holding devices 215B and 215D, each of whom are in separate delivery trucks.

The server 205 may be programmed with any number of additional functions. For example, the server 205 may retransmit to all endpoint devices 215 of a session the updated location data for each other endpoint device 215 in that session. This allows each endpoint device 215 to be aware of the (relatively) real-time location of the other endpoint devices 215 of the same session. Alternatively, the updated location information may be transmitted only to a subset of the endpoint devices 215. For example, in the case of a delivery service, it may be that only the supervisor using the tablet endpoint device 215C needs up-to-date location information. In such an embodiment, the current locations of endpoint devices 215B and 215D may be transmitted to the server 205 and then retransmitted by the server 205 to the tablet 215C. The decision of the server 205 to do this would be based upon configuration data, as described elsewhere herein. The session identifier for each user may identify the role of the user of the endpoint device 215, allowing the server 205 to know which endpoint device 215 should receive specific information.

In the depicted embodiment of FIG. 4, users of endpoint devices 215B and 215D may have associated user data as described elsewhere herein. Thus, those endpoint devices 215 transmit an identifier or token to the server 205 identifying the endpoint device 215 and the associated mode, status, or role of the user of the device 215. This identifier may be an integer or other unique identifier known in the art. Endpoint device 215C, however, is configured for administrator or supervisor mode, and thus transmits a token identifying the endpoint device 215 and the role of the user as a supervisor. Based on configuration options, the server 205 knows that location data received from any endpoint device 215 in this session assigned to a "driver" user should be transmitted to endpoint device 215C (or any other endpoint device 215 assigned to a supervisor), but not to devices 215 assigned to other drivers, such as endpoint device 215B and 215D.

Other information may likewise be distributed according to this logic. For example, when the driver for endpoint device 215B arrives at work, the driver may connect to the server 205 via the application, and request the day's work orders. Those work orders will have been entered or set up by a supervisor, such as a supervisor using endpoint device 215C or, alternatively, a supervisor using an administrative workstation such as endpoint device 215E. Those work orders may be sent to and stored by the server 205, awaiting the arrival of the drivers for the day. When the driver for endpoint device 215B arrives, and the driver's user ID and session are transmitted to the server 205, the endpoint device 215B can request the work orders, if any, assigned to that driver, based on matching the driver's ID. Alternatively, other logic may be used. For example, the endpoint device 215 may simply transmit that the role of the endpoint device's 215 user, and request the next available work order appropriate for a user with that role. Again, the server 205 is programmed to respond to these requests but is agnostic as to the particular nature or operational significance of the roles. The server 205 simply receives an identifier from the endpoint device 215, i.e., an instruction, and responds.

The data-agnostic nature of the server 205 may be better understood through further examples. Referring again to FIG. 4, an entirely different situational awareness scenario can be envisioned. For example, consider a circumstance in which the depicted system is used by a utility company to manage meter readings in the field, such as in a remote environment involving widely dispersed residences or facilities. In such an embodiment, each meter reader has an endpoint device 215B or 215D, and, upon connecting to the system, receives from the server 205 an assignment of addresses or other locations that the meter reader is to visit for the day. The reader would then proceed in the reader's vehicle to the first such location. As described above, the endpoint device 215B relays at periodic intervals the detected location of the endpoint device 215. This location may be accessed by a supervisor using tablet 215C to ensure that all readers are en route to the correct locations. Upon reaching the first location, the reader carrying endpoint device 215B marks the location as having been serviced, and then proceeds to the next location on his or her route. This process continues throughout the day.

However, in this illustrative embodiment, the supervisor using tablet 215C receives data 203C from a weather service indicating that a dangerous storm is approaching. This data may indicate the location, size, shape, and direction of the storm, or the supervisor may draw the approximate shape or location of the storm on a map in the application on endpoint device 215C. This data can then be relayed to the server 205 as an alert or notification. The geographic area defined by the alert is then compared by the server 205 to the current locations of the endpoint devices 215B and 215D in the session, and any endpoint devices 215 located within the designated geographic area then receive an alert notifying the holder of the endpoint device 215 of the storm and its location. The endpoint devices 215 may then display the storm, or may directly connect to the same data source 203C to view the most current information about it. Again, the server 205 need only know that, when it receives a certain type of data with an alert status, the server 205 transmits an alert code or message typed in by the user of the tablet 215C to all connected endpoint devices 215 in the session located within the geographic area defined by the alert message. For example, the supervisor using endpoint device 215C may associate with the alert message the text "storm approaching, seek shelter immediately" and the server 205 will relay that message to the impacted endpoint devices 215.

The same basic functionality can be used to implement multi-role users, which is particularly helpful where the nature of an emergency may demand a different type of responder. For example, the same system depicted in FIG. 4 may be used by a dispatcher to alert relevant personnel within a geographic region of a type of emergency. By way of example, a dispatcher using tablet 215C may receive an emergency call indicating that a vehicle is on fire on a highway. The dispatcher may then send an alert to the server 205 with the address of the emergency and an indicator that the nature of the emergency is "fire." The server is pre-configured with data indicating that endpoint devices 215B for users with the role "firefighter" should be given an alert directing them to the location. Thus, when the server 205 receives a location and an alert request of type "fire", the server 205 identifies all endpoint devices 215 assigned the role "firefighter" and located within the geographic region of the location of the emergency, and sends a notification to those endpoint devices 215 that there is a fire emergency, and transmits the location of the fire to those endpoint devices 215.

This has the advantage of not sending irrelevant alerts to all devices in the session, which minimizes traffic and emphasizes the importance of messages that are received. The way of making and using the system will be clear to one of ordinary skill in the art. The server 205 has or offers a number of application programming interfaces (API) and/or software development kits (SDK) which can be accessed and used from a mobile device application 217 to send and receive data to the server 205. To prevent unauthorized access, all applications 217 may be required to authenticate sessions or connections via a license key or other code. An advantage of this architecture is that each endpoint device 215, although part of a session of related endpoint devices 215, contains a streamlined, uncluttered view of relevant activity to the user. This enables the user to quickly view and assess only situational awareness data that directly pertains to that user's situation, reducing the amount of unnecessary and superfluous information provided to any given decision maker in the session. Likewise, this allows managers and administrators to monitor more easily the status of multiple users simultaneously, helping to ensure that tasks are completed and goals are met.

The server 205 may implement, in cooperation with the client software 217, any number of additional functionalities. For example, the server 205 may be configured to provide automatic task assignment based upon any number of criteria. Tasks may be set up in the system by administrators, and set to assign automatically based on proximity of a user of the appropriate role. For example, in a delivery context, there may be a pickup at a particular location, and upon a user with the role "driver" arriving within a threshold distance of the pickup location, the task to pick up that delivery may be automatically assigned to that driver, who receives notification on his endpoint device 215 of the assigned task and the location. The application 217 may then do anything else that the application is programmed to do, such as automatically route the driver from his or her current course to that pickup location.

In an embodiment, the functions of the server 205 include messaging, location, and workflow management. The server 205 may further functions and/or data elements may include people, users, date/time, any or all of which may be associated with events, assets, and the various elements of the system in a given embodiment. Additionally, the server 205 may be programmed to support basic administrative functions, such as configuration of the server, services, user accounts, roles, security access levels, and other customization of the associated descriptors. For example, from a server 205 perspective, a "firefighter" role need only be an integer in a table associated with a text description of "firefighter." This configuration data is provided by an administrator to support a particular application 217.

Additionally, the applications 217 may be integrated with external systems, technologies, or sensors. In the depicted embodiment, a sensor 215A in the form of an optical camera is attached via the telecommunications network 207 to the server 205. This functions as an additional endpoint device 215, which can be controlled and operated by the server 205.

For example, the same system depicted in FIG. 4 may be used as a security system by an off-campus security company. In such a situation, a security camera 215A may be positioned near a stairwell, and may be one of dozens or hundreds of security cameras that form the monitoring system. When a security guard holding an endpoint device 215B encounters an emergency situation in the stairwell, such as an assault or an injury, the security guard can use the security application 217 to request assistance by identifying the nature of the emergency (e.g., "injury", or "crime"). The server 205, having data concerning the location of all the cameras attached to the system, can then automatically direct the feed from camera 215A to a dispatcher 215C who can then monitor the situation and coordinate a response in real-time, and can notify appropriate first responders.

The external devices 215 may be other devices besides cameras. For example, RFID tags and antennas may be used, as well as other types of sensors, ranging from temperature sensors to smoke detectors to motion detectors, audible sensors, seismic sensors, and so forth.

It is important to understand that the systems and methods described herein are not big data analytics tools. Rather, these systems and methods use big data and analytics tools as inputs (e.g., observations 110 in the OODA loop), filter non-actionable data, and provide a common operational picture, which may include context-relevant elements of analytics or big data inputs to inform decision-making.

The systems and methods provided herein facilitate the creation of a uniform platform for providing a common operational picture based on a plurality of disparate and nominally unrelated data sources. This is done, as described herein, by utilizing real-time data received from multiple sources (e.g., sensor systems, third party data sources, client point solutions, client legacy data and/or systems, etc.), filtering out unnecessary data points, and providing a common, real-time operational picture of relevant data. This may be done through dashboard views, notifications, chat, messaging, and other communication techniques. This data is combined with time and place data, such as the location of users via endpoint devices and the presence and status of things (e.g., IOT data). The systems and method described herein provide the framework to unify these various data sources into a single operational view and then project the future system state forward to assist in context-aware real-time decision support via a server platform which itself is context-agnostic.

The server functions may include some or all of various services, sometimes referred to as "microservices." These include one or more services selected from location, mapping, messaging, and other services described here. Other, non-limiting examples of such services include: identity services (including but not necessarily limited to Active Directory, LDAP, SAMLP, OAuth2, Google Apps, WS-Federation, PingFederate, SSO, and multi-factor authentication); messaging services (including but not necessarily limited to text, audio/video, group chat, mentions, attachments, presence, and SMS); GIS (including but not necessarily limited to geofencing, nearby, routing, geocoding, DVR, tile provider, telestration, and annotation); social (including but not necessarily limited to ratings, achievements, leaderboards, activity feeds, sharing, and wikis); scheduling (including but not necessarily limited to calendars, and event triggers); settings (including but not necessarily limited to calendar, tasking, and event triggers); MDM (including but not limited to HockeyApp, MobiControl, local store, and geo provision); sensors (including but not necessarily limited to general purpose sensors, OBD, and event triggers); and analytics.

The systems and methods described herein are explained with respect to the illustrative example of a conventional client-server operation, but it will readily apparent to a person of ordinary skill in the art that other system architectures for implementing the functions of the server are possible and within the skill of a person of ordinary skill in the art. By way of example and not limitation, the sever may be replaced or augmented by a functionally equivalent distributed computing environment, such as a peer-to-peer network or block chain network.

While the invention has been disclosed in conjunction with a description of certain embodiments, including those that are currently believed to be the preferred embodiments, the detailed description is intended to be illustrative and should not be understood to limit the scope of the present disclosure. As would be understood by one of ordinary skill in the art, embodiments other than those described in detail herein are encompassed by the present invention. Modifications and variations of the described embodiments may be made without departing from the spirit and scope of the invention.

The invention claimed is:

1. A method for providing decision support to a user comprising:
   providing an endpoint device of a user;
   providing a server computer;
   at said server computer:
     associating an identifier with said user;
     associating a first context role identifier with said identifier; and
     associating an indication of an event context;
   said endpoint device transmitting to said server computer, at a predetermined frequency, a current geographic location of said endpoint device;
   receiving at said server computer an indication of an event associated with said event context and a geographic location of said event; and
   at said server computer, if said endpoint device is determined to be within a notification threshold distance of said event based on a comparison of said received current geographic location of said endpoint device to said geographic location of said event, transmitting to said endpoint device a notification message, the content of said message being determined based upon said first context role and said event context of said event;
   before said transmitting step, said endpoint device receives from said server computer a predetermined set of tasks assigned to said user; and
   said endpoint device transmitting to said server computer, at a predetermined frequency, a current geographic location of said endpoint device while said user performs said assigned set of tasks.

2. The method of claim 1, wherein said notification threshold distance of said event is received at said server from a third party data source.

3. The method of claim 1, wherein said endpoint device comprises a mobile device of a user.

4. The method of claim 1, wherein said transmitted message being determined based upon said first context role and said event context of said event.

5. The method of claim 1, wherein said indication of an event associated with said event context and a geographic location of said event is received via a sensor communicably coupled to said server computer.

6. The method of claim 5, wherein said sensor is selected from the group consisting of: an optical, light, imaging, or photon sensor; a motion or movement sensor; an electromagnetic sensor; an acoustic sensor; an automotive sensor; a chemical sensor; an electrical sensor; a magnetic sensor; a fluid sensor; a radiation sensor; a navigation instrument; an orientation or direction sensor; a pressure sensor; a thermal, heat, or temperature sensor; a force, density, or level sensor; a proximity or distance sensor; and an Internet-of-things device or sensor.

7. The method of claim 1, wherein said indication of an event associated with said event context and a geographic location of said event is received via a third party data source communicably coupled to said server computer.

8. The method of claim 1, wherein said indication of an event associated with said event context and a geographic location of said event is received via said endpoint device.

9. The method of claim 1, wherein said endpoint device comprises a client application communicably coupled at least one external data source.

10. The method of claim 9, wherein said external data source comprises a third party point solution.

11. The method of claim 1, wherein said event context comprises an urgent condition, said first context role identifier comprises a type of personnel trained to address said urgent condition, and said message comprises instructions for said user to address said urgent condition.

12. The method of claim 1, wherein said event context comprises an urgent condition, said first context role identifier comprises a type of personnel not trained to address said urgent condition, and said message comprises instructions for said user to avoid said urgent condition.

13. The method of claim 1, wherein said message comprises an identification of said event and a geographic location of said event.

14. The method of claim 13, wherein said endpoint device displays on a display of said endpoint device a map indicating said received geographic location of said event indicated in said message and said identification of said event.

15. The method of claim 1, wherein said content of said message is further determined based upon a set of predefined rules.

16. The method of claim 1, further comprising:
   receiving at said server computer an indication of a change in the status of said event; and
   at said server computer, transmitting to said endpoint device a second notification message, the content of said second notification message being determined based upon said first context role and said event context of said event.

17. The method of claim 1, wherein said transmitting step is performed automatically by said server computer.

18. The method of claim 1, wherein said transmitting step is performed only after receiving at said server computer human-provided instructions to perform said transmitting step.

\* \* \* \* \*